April 7, 1959

F. W. WALKER ET AL 2,881,110

METHOD AND APPARATUS FOR FORMING COMPLEX
GLASS FIBER AND RESIN SHAPES

Filed June 21, 1955

INVENTORS
FREDERICK W. WALKER
BY PAUL C. CADY
LOWELL B. JOHNSTON

ATTORNEYS

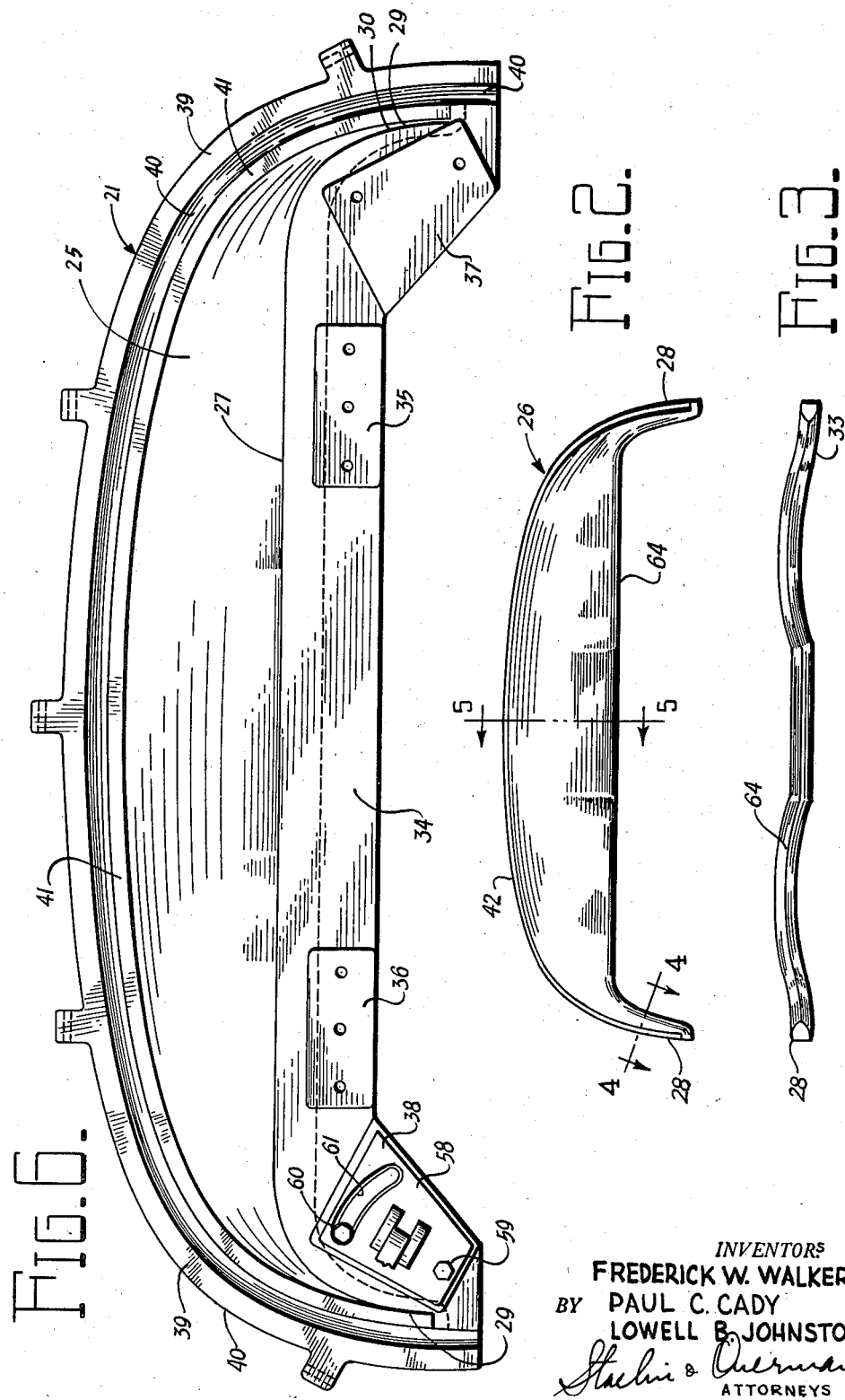

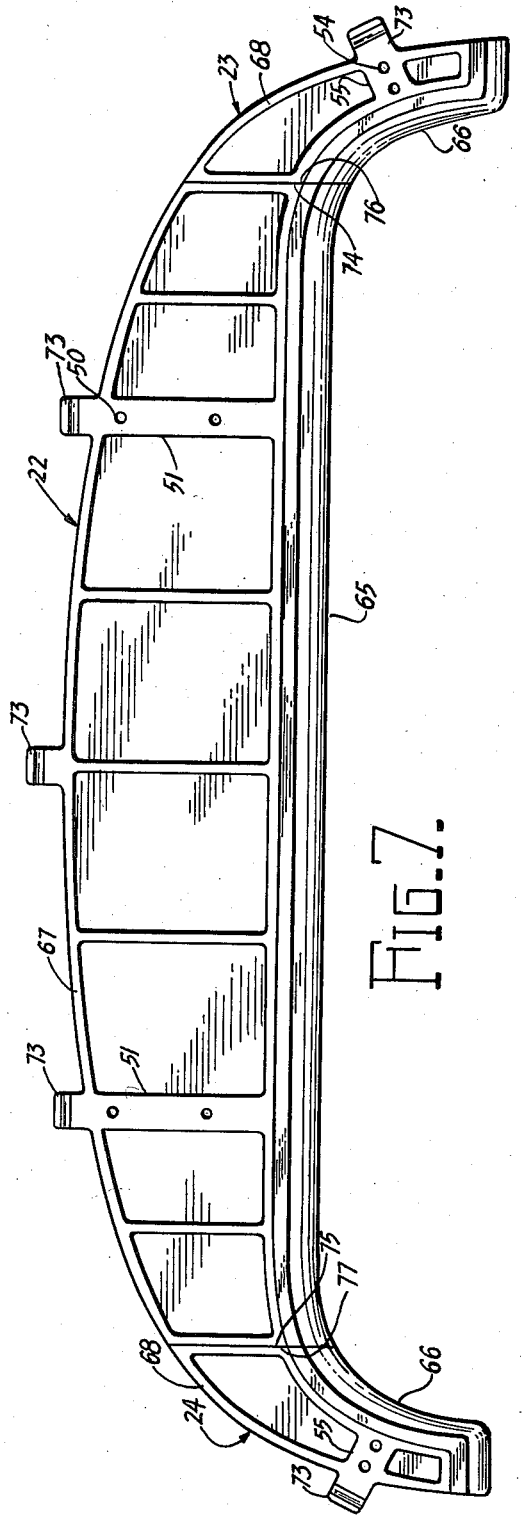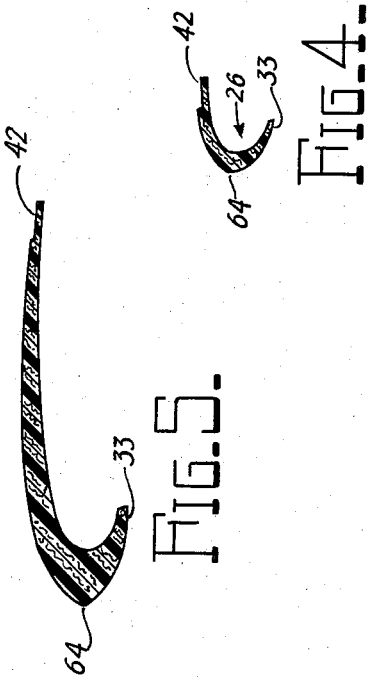

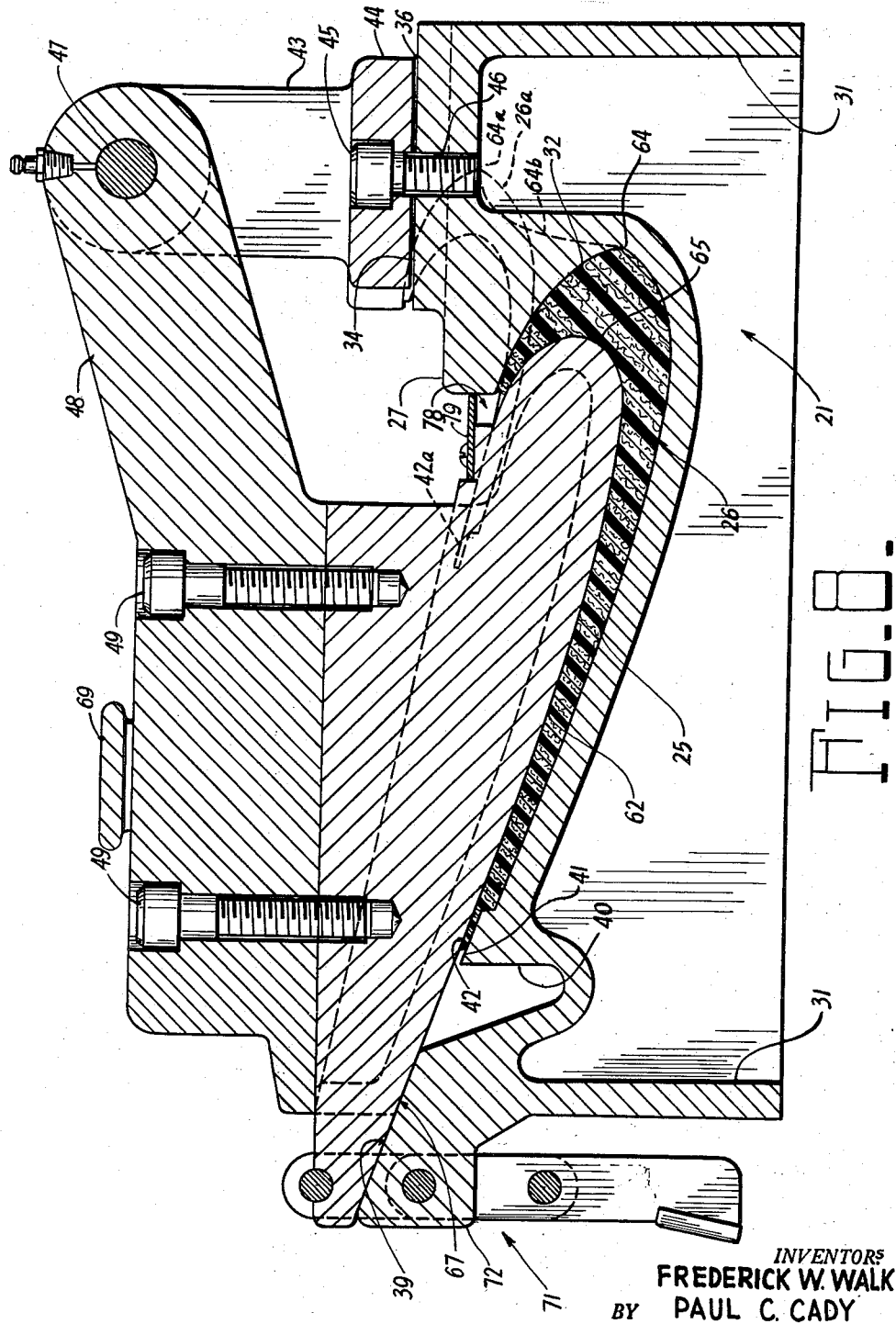

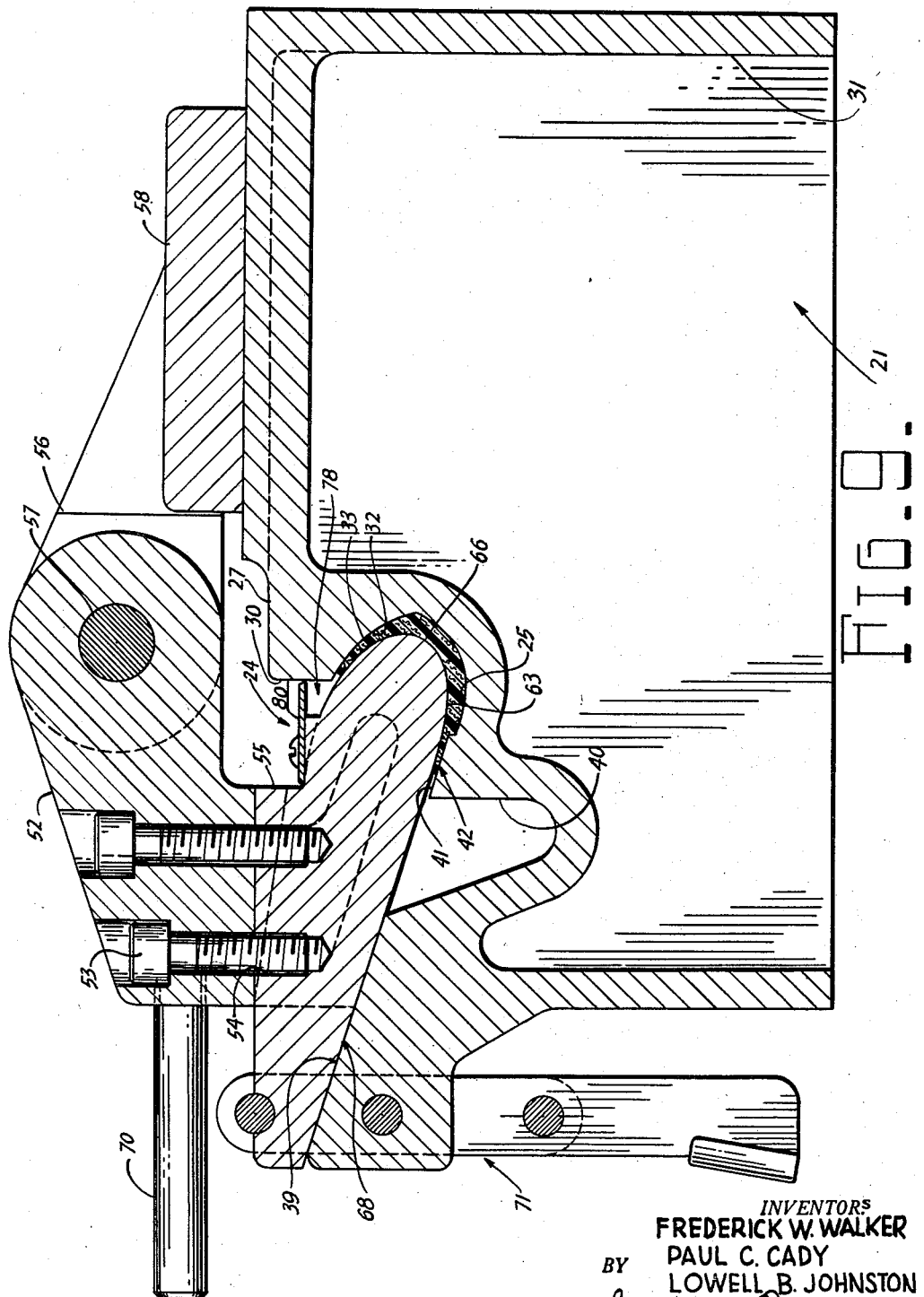

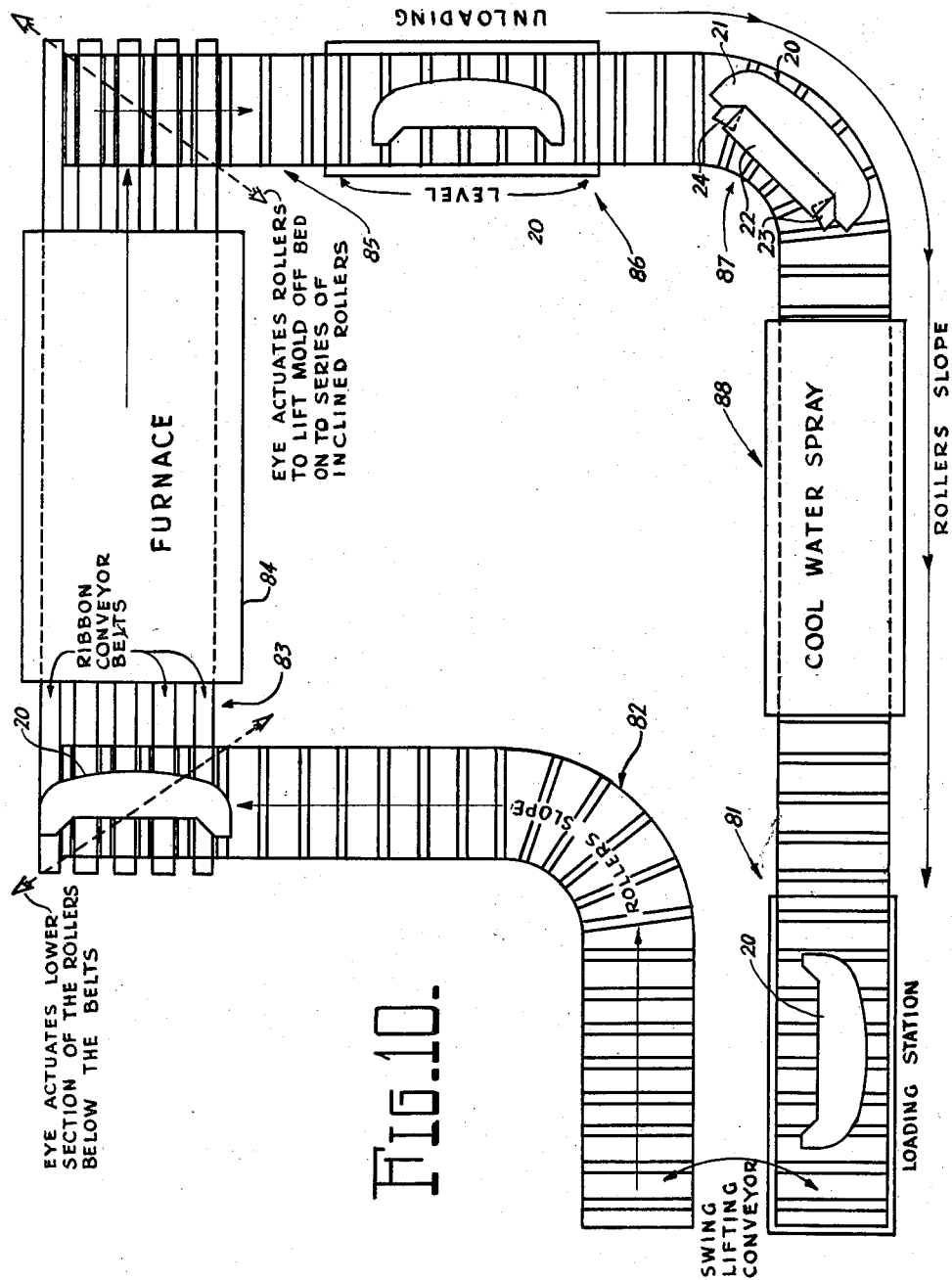

United States Patent Office 2,881,110
Patented Apr. 7, 1959

2,881,110

METHOD AND APPARATUS FOR FORMING COMPLEX GLASS FIBER AND RESIN SHAPES

Frederick W. Walker, Johnstown, and Paul C. Cady and Lowell B. Johnston, Newark, Ohio, assignors to Owens-Corning Fiberglas Corporation, a corporation of Delaware Application June 21, 1955, Serial No. 516,842

10 Claims. (Cl. 154—110)

This invention relates to a method and apparatus for the formation of complex molded shapes comprising glass fibers and synthetic resin.

It is the purpose of the invention to produce articles such as casings, panels and housings from densified glass fiber wool and resin. The final densified material of the articles produced according to the invention may be described either as permanently set and bonded, densified glass wool or as porous, glass-reinforced, resinous material. The invention does not contemplate the production of solid masses of resin reinforced with glass fibers but instead the resin, though present in varying amounts according to the article to be constructed, is employed principally for the purpose of bonding the glass fibers in their densified contoured shape.

It is contemplated that the process and apparatus of the invention will be utilized for the fabrication of various structural and housing parts particularly where thermal and sound insulation are advantageous and where impact cushioning is desired.

By reason of the flexibility of the glass fiber wool from which an article is produced according to the invention, the parts may have compound and complex curvatures and the bonding of the glass fibers to each other by the resin extending throughout the densified mass retains the glass fibers in their densified and contoured condition so that the parts molded therefrom possess sufficient structural integrity to function as covers, housing parts, etc., where no great mechanical strain is encountered.

The apparatus and method of the invention also enable the molding of a cover or panel from resin bonded, glass fiber wool wherein the cross sectional configuration of the panel or shape includes a return lip or similar structure overlying or spaced from the main portion of the body and where the glass fibers in the article are bent around the portions connecting the lip or similar structure to the main body portion and the tensile strength of the glass fibers is thus available for maintaining the structural integrity of the main portion of the body and the return lip or similar, somewhat separated, portion of the body.

As an example of a shape or article embodying all of these features and having a contour and general configuration which render it almost impossible to be molded in the conventional manner, the invention will be illustrated as it is employed for the fabrication of an automobile dash cowling crash pad. In most automobile bodies there is a generally horizontally extending surface above the instrument panel which extends from the top edge of the instrument panel forwardly to the bottom of the windshield. This surface, while generally horizontal, often has a compound curvature configuration to blend into the cowling effect created over the upper edge of the instrument panel and to blend into the curved lower edge of the windshield. This is particularly true in the so-called "wrap-around" windshields where the corners of the windshield extend rearwardly anywhere from 6 to 12 inches beyond the center part of the windshield. This surface will be called the "dash cowling."

The dash cowling, extending generally horizontally as it does, and being blended at its rear edge into the upper edge of the panel, presents a relatively sharp upwardly directed corner against which the head or face of a passenger in the front seat is violently thrown if the automobile should be abruptly stopped, for example, by collision. The crash pad which will be used as an illustration of an article produced according to the invention, is designed to overlie the generally horizontal area of the dash cowling panel and to extend around the corner formed by the rear edge of the cowling panel and the top edge of the instrument panel so that it presents a shock absorbing or cushioning mass overlying the metal sheets from which the cowling panel and instrument panel are made.

A crash pad of resin bonded densified glass fiber wool produced according to the invention has sufficient flexural and structural strength so that after fabrication it can be handled as a unit. Because the glass fiber is porous and the fibers are merely bonded to each other by the resin thereon, the crash pad has only slight resistance to compression and a sharp blow struck, for example, by the forhead of a passenger, crushes the material inwardly absorbing the force of the blow and greatly lessening the likelihood of damage or injury to the person whose head has produced the blow.

Crash pads for such uses may be fabricated from other porous materials such as sponge rubber, but a molded piece of sponge rubber of sufficient size to cover the cowling panel of a modern automobile and of not too great thickness to blend into the general configuration of the automobile, is a flexible structure and is difficult to handle after it is fabricated and during its installation in the automobile.

It is an additional advantage of articles fabricated according to the invention that they can be given decorative coatings or covers either at the time of initial manufacture or at a subsequent time, depending upon the nature of the material employed for producing the coating or cover. Articles produced according to the invention may be covered with synthetic or natural fabrics by adhesion or by mechanical connection such as sewing. Integral coatings may also be applied. The application of a decorative cover or coating either integrally bonded or mechanically attached does not impair either the sound or thermal absorptive qualities or the shock resistance or impact absorption of articles produced according to the invention.

The advantages, the nature, the possibilities and the utilization of complex shapes produced according to the invention will be better understood from the specification which follows and from the drawings in which:

Fig. 2 is a plan view on a smaller scale of a crash pad produced in the mold shown in Fig. 1.

Fig. 3 is a view in front elevation of the crash pad illustrated in Fig. 2.

Fig. 4 is a vertical sectional view on an enlarged scale taken substantially on the line 4—4 of Fig. 2.

Fig. 5 is a view similar to Fig. 4 but taken on the line 5—5 of Fig. 2.

Fig. 6 is a plan view on a larger scale of the cavity section of the mold shown in Fig. 1, with certain parts broken away.

Fig. 7 is a plan view of the punch section of the mold shown in Fig. 1.

Fig. 8 is a greatly enlarged vertical sectional view taken approximately along the line 8—8 of Fig. 1 and showing the mold of Fig. 1 in closed position.

Fig. 9 is a view similar to Fig. 8 but taken approximately from the position indicated by the line 9—9 of Fig. 1 and also showing the mold in closed position.

Fig. 10 is a simplified plan view of a production line for the utilization of the molds illustrated in Fig. 1 in the production of numbers of parts or articles, specifically the dash cowling crash pad shown in Figs. 2–5.

Figure 1:
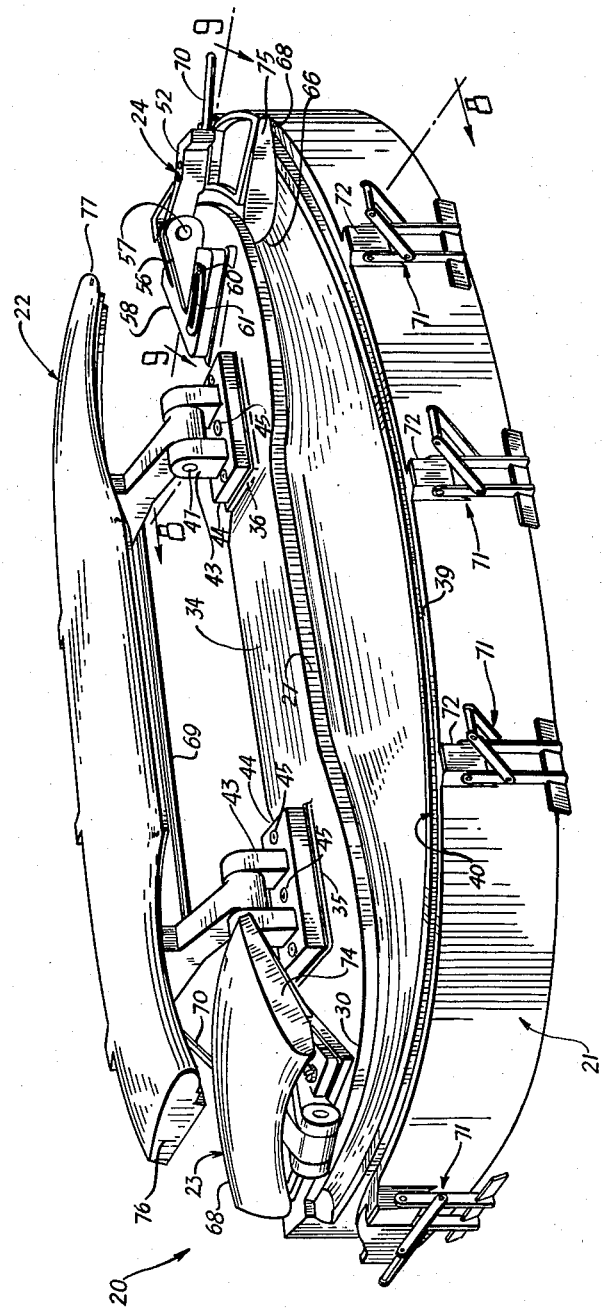
Fig. 1 is a view in perspective of a mold designed for the fabrication of a single automobile dash cowling crash pad from a resin bonded glass fiber material according to the invention.

The mold illustrated in Fig. 1 and generally indicated by the reference number 20 consists of two major parts, a cavity generally indicated at 21 and a punch comprising three parts, a center section generally indicated at 22 and two wing sections generally indicated at 23 and 24.

The cavity 21, which is shown in plan view in Fig. 6, has a generally crescent shaped molding surface 25 contoured according to the upper surface of a crash pad 26 (Fig. 2) which is illustrative of articles that may be produced according to the invention. The contoured surface 25 is slightly dish shaped in cross section (Fig. 8) and at its lower forward end sweeps upwardly and rearwardly forming an overhanging ledge 27 that is spaced vertically above the surface 25. At the ends of the cavity 21 the surface 25 is narrowed down and swings forwardly in the shape and contour of horn sections 28 (Figs. 2 and 3) on the crash pad 26. The horn sections 28 of the crash pad are molded in horn sections 29 of the cavity 21. The overhanging ledge 27 similarly sweeps forward to form horn ledges 30 on the cavity 21.

Structurally the cavity 21 is provided with a vertical perimetrical skirt 31 (Fig. 8) which supports the cavity 21 and thus the mold 20 on any flat surface or series of rollers or belts. At the front the surface 25 blends into a rearwardly and upwardly sweeping surface 32 underlying the ledge 27 and contoured according to the exterior of a return lip 33 (Figs. 3–5) on the crash pad 26.

The skirt 31 is integral with a horizontal plate 34 on the cavity 21 which extends across the front of the cavity and the edge of which forms the ledge 27. The plate 34, in the mold illustrated in the drawings, is provided with four flat pads 35 and 36 which are identical and 37 and 38 which are identical though reversed. At the curved rear edge of the surface 25, the cavity 21 has a sweeping ledge 39 that forms a clamping surface against which the punch 22 is locked when the mold is closed and which is horizontally spaced from the surface 25 by a depressed flash channel 40.

In the particular mold 20 shown in the drawings, which, of course, is designed for the fabrication of a crash pad, the edge of the channel 40 adjacent the contoured surface 25 has a raised flat lip 41 which extends around the entire surface 25 and (as can best be seen in Figs. 8 and 9) cooperates with the undersurfaces of the punch sections 22, 23 and 24 to form a thin flange-like section 42 along the rear edge of the crash pad 26. The flange 42 is inserted beneath a molding at the corner between the generally horizontally dash cowling and the upwardly extending windshield of the automobile in which the crash pad is employed in order to retain the crash pad in place on the automobile. Because of the close spacing between the lip 41 and the undersurfaces of the punch sections 22, 23 and 24, the flange 42 is densified to a degree much greater than other portions of the crash pad 26 so that the flange 42 may act as a stiffener for the pad 26 during handling.

It will be appreciated also that the flange 42 is integral with the main body of the crash pad 26 because many of the individual glass fibers will extend from the thicker portions of the body of the crash pad 26 into the flange 42. In fact, there may be the same number of fibers present in different parts of an article molded according to the invention which have substantially different thicknesses; the difference in thickness resulting only in different densities of the parts of the article.

The pads 35 and 36 mount pairs of support ears 43 which are erected upon blocks 44 secured to the pads 35 and 36 by a series of bolts 45 threaded into tapped holes 46 in the plate 34. A horizontal pivot pin 47 (Fig. 8) extends through each pair of ears 43 and pivotally supports an arm 48 which is rigidly secured by bolts 49 to the center punch section 22 (Fig. 7), the bolts 49 being threaded into tapped holes 50 in main ribs 51 extending above the upper surface of the punch section 22. The wing punch sections 23 and 24 are similarly mounted (Figs. 1 and 9) by shorter arms 52 connected by bolts 53, that are threaded into tapped holes 54 in main boss-like ribs 55 of the wings 23 and 24, to suitable ears 56 which mount horizontal swivel pins 57. The ears 56 are integral with and erected from blocks 58. Each of the blocks 58 (see Fig. 6) is pivotally mounted on one of the pads 37 or 38 by a pair of bolts 59, serving as a swivel pin, and 60, serving as a guide pin, and extending through an arcuate slot 61 in the block 58. Thus each of the blocks 58, the support arms 52 and the wing portions 23 and 24 of the punch can be pivoted on a vertical axis, the wing section 24 being swingable from the position shown in Fig. 1 to an outward position (not shown) by movement in a counterclockwise direction. This movement is utilized when the punch sections 23 and 24 are being swung into their open positions and again when they are being reinserted into their closed positions.

Each of the punch sections, the main section 22 and the two wings 23 and 24, has a lower contoured surface 62, on the section 22 (Fig. 8), and 63 on either of the wings 23 or 24 (Fig. 9). These lower surfaces 62 and 63 are complementary to but spaced from the surface 25 both in the main and horn section 29 of the cavity 21. In the horn sections 29 of the cavity 21 and beneath the horn ledges 30 of the ledge 27, the upwardly sweeping surface 32 continues, blending into the surface 25 of the cavity 21 and continuing the contour of the lip 33 around the corners of the horn sections 28 of the crash pad 26.

In Fig. 8 the cross sectional configuration of the crash pad 26 on the plane of the section of Fig. 8 is shown in solid lines and cross hatching. The cross sectional configuration of the crash pad 26 at the ends of the center section 22 of the punch is shown in broken lines denominated 26a with the flange-like section 42 at that point indicated as 42a and a front edge 64 of the crash pad 26 indicated at 64a. A broken line, indicated by the reference number 64b, shows the sweeping contour of the front edge 64.

The center section 22 and wing sections 23 and 24 of the punch have front lips 65 and 66, respectively, which are thrust inwardly between the surfaces 25 and 32 and, while somewhat complementary to these surfaces at the front of the crash pad 26, are spaced some distance therefrom when the mold is closed as in Figs. 8 and 9 to provide for a thicker front to back section at this part of the crash pad 26.

At the rear of the punch sections 22 and 23 there is a flat ledge 67, on the center section 22, and 68, on the wing sections 23 and 24, which clamps tightly against the ledge 39 extending around the cavity 21 when the mold is closed and thus controls the overall thickness of all parts of the crash pad 26 and its resulting density in various portions depends only on the density of the material or combination of material inserted in the mold before closing.

The center mold section 22 is handled by means of a bar 69 extending between the arms 48 and the wing sections 23 and 24 are handled by means of handle rods 70 which protrude from the fronts of the arms 52.

A plurality of toggle clamps, each generally indicated at 71, are mounted on bosses 72 formed on the outside of the cavity 21 and adapted to be engaged with grooved projections 73 extending from the front ends of the ribs 51 of the center punch portion 22 and the ribs 55 of the wing punch sections 23 and 24. The toggle clamps 71 permit an operator to tightly squeeze the punch sections 22 and 23 and 24 into their closed positions illustrated in Figs. 8 and 9 and to tightly clamp the mold closed with the ledge surfaces 39—67 and 39—68 together.

The glass fiber material to be used in fabricating an article according to the invention is impregnated with sufficient quantity of a liquid resin, say 20% by weight of phenol formaldehyde, so that substantially all of the individual, very fine, glass fibers in the wool are at least partially coated with the liquefied resin and the intersections and overlapping engagements of the fibers will have small fillets of liquid resin to bond them to each other when the resin is cured or set up. The glass fiber wool employed according to the invention should have the majority of its fibers extending at least generally parallel to the major planes of its faces and a substantial portion of the fibers should extend generally perpendicularly to these major faces. The material thus impregnated may be precut into blanks of configuration appropriately outlined to enable the blanks to be laid in place in the cavity 21.

If two or more thicknesses of impregnated glass fiber wool are used to build up the material to be densified, when they are pressed against each other in the densification achieved by pressing the punch into the cavity, the generally perpendicularly extending fibers in each blanket or layer of glass fiber wool penetrate into the surface of the other layers or blankets and entangle with similar fibers in the other layers and blankets to cohere the masses to each other.

While it is, of course, possible to proceed according to the invention utilizing only one blanked mass of impregnated wool, the degree of densification to be achieved may make it easier to employ two or more layers. For example, if the starting material has a density, say, of 2 lbs. per cubic foot and the finished part is to have a density of, say, 12 lbs. per cubic foot, the material must be reduced 6 times in thickness and a single layer or blanket of wool might have to be 12 inches or more thick. Handling several thinner layers might make the mold loading easier.

The use of several layers rather than a single layer has an additional advantage in that opposite surfaces of the finished article may be given different densities by employing two or more layers of starting material of different densities, so that, although both are compressed, the one continues to be denser than the other. Furthermore, by laying in partial sections, i.e., strips or smaller pieces of material in addition to the main blanks, areas of desired sizes having higher densities can be produced as integral parts of the finished article.

In placing the resin impregnated glass fiber wool in a mold according to the invention, a workman lays a layer on the surface 25 and folds the layer upwardly against the overlying surface 32 tucking his fingers in between the main body of the mass of wool which lies on the surface 25 and the folded over edge of the wool which will be pressed up against the surface 32. If a second thickness of resin impregnated glass fiber wool is to be used it is laid on the first layer and its edge also tucked into the space between the surface 25 and the surface 32. Similarly, inserts to create high density areas are emplaced.

By folding the thicknesses of impregnated wool and inserting the folds between the surfaces 32 and 25 the fibers in the wool are bent around the sharp corner at the front edge 64 so there is no tendency for the return lip 33 of the crash pad to separate from the main portion of the crash pad body.

After inserting one or more layers or thicknesses of low density impregnated glass fiber wool, the workman swings the center punch section 22 over into the position illustrated in Fig. 8, thrusting the edge 65 into the space between the cavity surfaces 32 and 25 and clamping the surface 67 tightly against the surface 39 by engaging and locking the toggle clamps 71. The workman then lifts the protruding portions of glass fiber wool blankets out of the way and swivels the punch sections 23 and 24 around until neighboring edges 74 of the wing section 23 and 75 of the wing section 24 (Fig. 1) align with ends 76 and 77, respectively, on the center punch section 22. This is determined by the guide bolts 60 (Figs. 1 and 6) reaching the ends of the arcuate slots 61. The operator then swings the wing portions 23 and 24 of the punch over into the closed position shown in Figs. 1 and 9 thrusting the punch edges 66 into the space between the surfaces 32 and 25 (Fig. 9).

It must be observed that in the original blanking operation, i.e., the cutting of the uncured resin impregnated glass fiber wool to form blanks for the molding operation, the pieces are cut so as to fit into the spaces between the cavity 21 and the punch sections 22—24. However, if the pieces are slightly larger than necessary, the back edge of the pieces, i.e., that portion which overlaps the lip 41 to form the flange-like section 42, will be displaced into the flash channel 40 and thus will not interfere with closing the mold. Similarly, any excess material folded under the surface 32 may protrude upwardly between the edge of the surface 32 at the ledge 27 or 30 and the upper surface of the horns 65 and 66, i.e., into the open space indicated by the reference numeral 78 in Figs. 8 and 9.

The space 78 is closed off by a flat spacer plate 79 (Fig. 8) on the center punch section 22 and by plates 80 (Fig. 9) on the wing punch sections 23 and 24.

After the mold 20 is loaded and closed, as has just been described, it is in condition for passage through the production line illustrated in Fig. 10. The loading and closing of the mold is performed by the operators at a loading station generally indicated in Fig. 10 by the reference numeral 81. After the mold 20 is loaded and closed, it is lifted and swung over by a conveyor (not shown) onto a roller conveyor generally indicated at 82 which carries it over to the entrance end of a furnace conveyor, generally shown at 83. In the production line of Fig. 10 the furnace conveyor entrance is guarded by an electric eye which is actuated when one of the molds 20 reaches the end of the roller conveyor 82. The end section of the conveyor 82 then drops, lowering the mold 20 onto the end of the furnace conveyor 83 for moving it through a suitable curing furnace 84.

The length of the furnace 84, the temperature maintained therein and the speed of movement of the furnace conveyor 83 are determined by the characteristics of the particular resin with which the glass fiber wool is impregnated and by the thickness of the section being molded. In the example being described, utilizing phenol formaldehyde resin to bond and set the glass fibers in their contoured positions, a total furnace time of 13 minutes at 450° is utilized.

As the mold 20 is conveyed through the furnace the entire area of the cavity 21 and punch sections 22—24 are thoroughly heated so that heat is transferred to the crash pad 26 from all of the surfaces contacting both its interior and its exterior. By utilizing a continuous system wherein the molds 20, after closing, need not be opened until the particular crash pad in each mold is thoroughly cured, and where a plurality of individual crash pad forming molds are employed rather than a single cavity mold of the conventional press type, the curing may be effected by a "slow soaking" so that the interior of the crash pad 26 may be thoroughly cured and the resin therein set up without danger of burning the resin on the exterior of the crash pad 26.

After each of the molds 20 has passed through the furnace 84 it is lifted off the ribbon furnace conveyor 83 by actuation of another electric eye located at the end of the furnace conveyor 83 and transferred onto an inclined roller conveyor generally indicated at 85. This carries the mold 20 downwardly to an unloading station, generally indicated at 86, where the rollers of the conveyor are level and an operator can open the mold 20 by opening the toggle clamps 71, swinging the punch sections 22—24 upwardly and back and removing the crash pad 26. The open mold is then pushed off the unloading station 86 onto an inclined roller conveyor 87 which carries it through a cooling station generally indicated at 88 where, for example, the open mold 20 is sprayed with water to cool both the cavity 21 and punch sections 22—24. The open mold 20 rides on down the conveyor 87 until it returns to the loading station 81.

Decorative upper and/or lower surfaces may be put on fiber glass-resin shapes produced according to the invention in any of three ways. A decorative material such as a fabric, synthetic, coated or natural, may be placed over a finished crash pad 26 in the conventional way by cutting and sewing or cementing. A second type of coating may be placed on the crash pad by first producing the crash pad as described above and trimming any flash off its edges and then spraying or otherwise coating the surface of the crash pad 26 with a coating composition such as a vinyl acetate plastisol. The crash pad 26 with the plastisol coating may then be partially cured at a relatively low temperature to adhere the plastisol to the crash pad 26 by penetration of the plastisol into the interstices between the fibers and then it may be given an embossed surface, for example, by running an embossing roller over the surface or by pressing it against a secondary embossed mold and the material then given its final cure for setting up the embossed surface. If the surface is embossed by an embossing roller, the roller may be heated to sharply define the embossings and to finally cure the surface. Similarly, if the surface is embossed by inserting the crash pad coated with a partially cured plastisol layer into a mold, that mold may be heated and back pressure may be applied to the crash pad 26 for sharpening the embossings.

A third and simpler system and one which is preferred when the coating substance is such that it will withstand the low temperature, slow soaking cure of the binding resin, utilizes what may be termed a transfer coating. It has been found that if a formulation of from 50 to 90 parts by weight of a neoprene emulsion is combined with from 10 to 50 parts by weight of ordinary household starch, the resulting emulsion may be sprayed, painted, or otherwise spread over the surfaces 25 and 32 when the mold 20 is cool or only slightly warm. The resin impregnated glass fiber wool is then inserted into the mold 20 in the manner already described, compressed therein and put through the curing step. During such curing step the coating transfers from the mold onto the resin impregnated glass fiber body of the crash pad 26, the temperature in the furnace 84 fusing the coating substance so that it penetrates the interstices between the fibers and clings tightly to the fibrous mass. The coating dispersion is given the surface configuration of the surfaces 25 and 32 of the cavity 21 and, if such surfaces are embossed or otherwise decorated, the final molded surface of the coating of the crash pad 26 will reflect such decoration.

It has been found that similar transfer coatings may be fabricated from blended formulations of neoprene dispersion having approximately 45 percent solids in 80 to 98 parts by weight with diatomaceous earth in from 2 to 20 parts by weight, dry. A similar formulation substituting powdered talc for the dry earth may also be employed.

Specific proportions within the ranges given are chosen to provide the desired consistency for spraying or brushing and depend partly upon whether the mold 20 is warm or cold at the time of application.

Other emulsions or liquid forms of coating substances may also be employed as transfer materials depending solely upon whether or not the substances are injured by the soaking curing step through which each of the molds and its crash pad 26 are put to uniformly set up the resin impregnant of the glass fiber wool. In some instances it may be necessary to first coat the interior of the cavity 21 and the exteriors of the punch sections 22—24 with a mold stripping agent, for example, a silicone substance, to prevent adherence between the coating and the metal from which the cavity 21 and punches 22—24 are fabricated.

We claim:

1. A method for producing a glass reinforced molded body having a return lip spaced from the main portion of the body that comprises, impregnating a body of glass fiber wool having two major parallel faces and the majority of the fibers therein lying at least generally parallel to such faces, with sufficient resinous material in liquid form to coat the fibers of such body but not to fill appreciable numbers of the interstices therein with resin, placing the impregnated mass against a surface having an interior contoured to the exterior of the main portion of the body and return lip of the desired finished product and folded into the space between the body and the return lip, inserting an incompressible member having a contour complementary to the contour of such surface into the fold of the mass betwen the lip and main portions of the mass, moving said member in between the lip and main portions of the mass along a path generally parallel to the main body of the mass for densifying the mass, and curing the resinous material while hodling the mass in densified condition.

2. A method for producing a glass reinforced molded body that comprises, impregnating a body of glass fiber wool having two major parallel faces and the majority of the fibers therein lying at least generally parallel to such faces with only sufficient resinous material in liquid form to bond the fibers to each other when cured, folding the impregnated mass over an incompressible member having a contour complementary to the desired contour of the joining portions of the lip and main portion of the body to be molded, whereby said fibers extend around such portions from such main portion to said lip, compressing a surface contoured according to the exterior of such portion against said mass for densifying said mass and curing the resinous material while holding the mass in densified condition.

3. A method for fabricating a densified glass fiber and resin article having a complex contour that comprises impregnating a plurality of blanket-like layers of glass fiber wool having a density substantially less than the density of the finished article and two major substantially parallel faces, with only sufficient quantity of resin in liquid form to bond the engaging portions of the fibers of said layers to each other, and not to fill appreciable numbers of the interstices in said layers, the glass fibers in said layers being heterogeneously disposed with the majority lying at least generally parallel to the major faces of said layers and a considerable portion extending generally angularly to such major faces, shaping one of said layers according to the surface contours of the finished article, assembling at least one other of said layers in laminar relation to the first said layer, applying pressure over the outer surfaces of said assembled layers generally normal to the surfaces thereof for densifying said layers into a shape retaining mass wherein the interstices remain unfilled and for interengaging the fibers at the inter-face surfaces of said assembled layers, and curing the resinous material while maintaining the mass in densified contoured conditon.

4. Apparatus for molding a glass fiber-resin mass having desired interior and exterior surface contours, a thin, generally planar main body portion and a return lip extending along at least part of one edge of said body, said apparatus comprising a female mold having the exterior contour of the main body portion and an overhanging section spaced from the main body portion, a male punch having a main body portion complementary to the interior surface of the finished mass, means for mounting said punch for swinging movement from an axis generally parallel to and spaced above said overhanging section whereby said punch is swung downwardly and into the space between the main body portion and the overhanging section of said female mold for forcing a fold of resin impregnated, glass fiber wool thereinto and means for holding said punch in such position while said apparatus is subjected to heat for curing the resin in the mass.

5. Apparatus according to claim 4 in which the female mold is generally crescent shaped in plan and the male punch is sectioned with each section separately mounted for swinging movement and the axes of each section generally parallel to tangents to the curves of the crescent.

6. Apparatus for molding a glass fiber-resin mass having desired interior and exterior surface contours, a thin, generally planar main body portion and a return lip extending along at least part of one edge of said body, said apparatus comprising a female mold having an upwardly open cavity bottomed by a surface that is complementary to the exterior of the finished part on the side opposite said return lip and an overhanging ledge spaced from said surface with the underside of said ledge having a contour complementary to the exterior of said return lip, a male punch having a main body portion complementary to the interior surface of the finished mass, means for mounting said punch for swinging movement from an axis generally parallel to and spaced above said overhanging section whereby said punch is swung downwardly and into the space between the main body portion and the overhanging section of said female mold for forcing a fold of resin impregnated, glass fiber wool thereinto and means for holding said punch in such position while said apparatus is subjected to heat for curing the resin in the mass.

7. A method for producing a shaped, rigid body of glass fiber wool having its major dimensions in two planes that comprises coating substantially all of the fibers of a blanket-like mass of glass fiber wool with only a sufficient quantity of resinous material in liquid form not to fill appreciable numbers of the interstices in such mass of wool with resin, conforming the mass to the contour of an exterior surface of the body to be molded, superposing at least one similar mass of glass fiber wool on said first mass, applying pressure to the superposed masses in directions generally normal to such contour for densifying the masses and cohering the fibers together into a shape retaining mass wherein the interstices remain unfilled, and exposing the densified mass to a long soaking heat for curing the resinous material in the mass while continuing to hold the mass in densified condition.

8. A method according to claim 7 in which densifying pressure is applied to the superposed masses by compressing the masses before heat soaking between generally complementary surfaces corresponding in contours to the interior and exterior of the product being produced.

9. A method according to claim 8 in which at least one of the pressure surfaces is applied to the mass in sections.

10. A method according to claim 9 in which the densified masses are stripped from the surfaces immediately after completion of the soaking heating of the masses and the surfaces are thereafter cooled for reception of a subsequent plurality of masses for fabricating a subsequent body.

References Cited in the file of this patent

UNITED STATES PATENTS

| | | |
|---|---|---|
| 2,534,617 | Mohrman | Dec. 19, 1950 |
| 2,552,839 | Brown | May 15, 1951 |
| 2,614,955 | Halsall | Oct. 21, 1952 |